(12) United States Patent
Sheidler

(10) Patent No.: US 7,788,889 B2
(45) Date of Patent: Sep. 7, 2010

(54) AGRICULTURAL HARVESTER WITH DUAL ENGINES AND ELECTRICAL POWER COUPLING

(75) Inventor: Alan Sheidler, Moline, IL (US)

(73) Assignee: Deere & Company, Moline, IL (US)

( * ) Notice: Subject to any disclaimer, the term of this patent is extended or adjusted under 35 U.S.C. 154(b) by 149 days.

(21) Appl. No.: 12/140,456

(22) Filed: Jun. 17, 2008

(65) Prior Publication Data

US 2009/0308036 A1   Dec. 17, 2009

(51) Int. Cl.
*A01D 34/03*   (2006.01)
(52) U.S. Cl. .......................................... 56/10.7; 701/50
(58) Field of Classification Search .......... 56/1, 56/10.2 R, 10.2 A–10.2 H, 11.1, 11.2, 11.9, 56/10.6, 10.7; 701/50, 207, 213, 208, 52–56, 701/65, 68; 60/698, 716, 276
See application file for complete search history.

(56) References Cited

U.S. PATENT DOCUMENTS 5,373,198 A * 12/1994 Lopez Jimenez ............. 307/68
5,995,895 A * 11/1999 Watt et al. ..................... 701/50
7,013,646 B1 * 3/2006 Serkh et al. .................. 60/698
2007/0130950 A1    6/2007 Serkh et al.

FOREIGN PATENT DOCUMENTS

| DE | 4340747 C1 | 4/1995 |
| EP | 2100494 A | 9/2006 |
| EP | 2100787 A | 9/2009 |

OTHER PUBLICATIONS

European Search Report dated Oct. 21, 2009 (5 pages).

* cited by examiner

*Primary Examiner*—Robert E Pezzuto
(74) *Attorney, Agent, or Firm*—Taylor IP, P.C.

(57) ABSTRACT

An agricultural harvester includes a first power unit having a first rated output. The first power unit is couplable with a first primary load, including a threshing system load. A second power unit has a second rated output. The second power unit is couplable with a second primary load, including a propulsion load. A first motor/generator is mechanically coupled with the first power unit, and a second motor/generator is mechanically coupled with the second power unit. The second motor/generator is configured to electrically drive at least one external load. The second motor/generator and the first motor/generator are electrically coupled together.

27 Claims, 3 Drawing Sheets

AGRICULTURAL HARVESTER WITH DUAL ENGINES AND ELECTRICAL POWER COUPLING

FIELD OF THE INVENTION

The present invention relates to work machines, and, more particularly, to work machines including an internal combustion engine which may be used to drive primary and external loads.

BACKGROUND OF THE INVENTION

A work machine, such as a construction work machine, an agricultural work machine or a forestry work machine, typically includes a power unit in the form of an internal combustion (IC) engine. The IC engine may either be in the form of a compression ignition engine (i.e., diesel engine) or a spark ignition engine (i.e., gasoline engine). For most heavy work machines, the power unit is in the form of a diesel engine having better lugging, pull-down and torque characteristics for associated work operations.

The step load response of an IC engine in transient after a load impact is a feature mostly influenced by the engine displacement, the hardware of the engine (e.g., whether it has a standard turbocharger, a turbocharger with waste gate or variable geometry, etc.), and by the software strategy for driving the air and fuel actuators (e.g., exhaust gas recirculation, turbocharger with variable geometry turbine (VGT), fuel injector configuration, etc.) with respect to the requirements of emissions legislation (e.g., visible smoke, nitrous oxides (NOx), etc.), noise or vibrations. The load impact may be the result of a drivetrain load (e.g., an implement towed behind the work machine) or an external load (i.e., a non-drivetrain load). External loads can be classified as including both parasitic and auxiliary loads. Parasitic loads are non-drivetrain loads placed upon an engine through normal operation of the work machine, without operator intervention (e.g., an engine cooling fan, hydraulic oil cooling circuit pump, etc.). Auxiliary loads are non-drivetrain loads placed upon an engine through selective operator intervention (e.g., an auxiliary hydraulic load such as an unloading auger on a combine, a front end loader, a backhoe attachment, etc.)

Engine systems as a whole react in a linear manner during the application of a transient load. Initially, the load is applied to the drive shaft of the IC engine. The IC engine speed decreases when the load increases. The engine speed drop is influenced by whether the governor is isochronous or has a speed droop. The air flow is increased to provide additional air to the IC engine by modifying the air actuators. A time delay is necessary to achieve the new air flow set point. The fuel injection quantity, which is nearly immediate, is increased with respect to both the smoke limit and maximum allowable fuel quantity. The engine then recovers to the engine speed set point. The parameters associated with an engine step load response in transient after a load impact are the speed drop and the time to recover to the engine set point.

An IC engine may be coupled with an infinitely variable transmission (IVT) which provides continuous variable output speed from 0 to maximum in a stepless fashion. An IVT typically includes hydrostatic and mechanical gearing components. The hydrostatic components convert rotating shaft power to hydraulic flow and vice versa. The power flow through an IVT can be through the hydrostatic components only, through the mechanical components only, or through a combination of both depending on the design and output speed.

A work machine including an IC engine coupled with an IVT may exhibit problems to be overcome in two ways: First, sudden loads placed on the drivetrain or vehicle hydraulic functions cause the engine speed to decrease. The response time to change the IVT ratio to reduce engine load once decreased is slower than necessary to prevent substantial engine speed drop and sometimes stall. Second, when an external load is applied to the IC engine, such as when filling the bucket of a front end loader on an IVT vehicle, the operator may command a vehicle speed substantially more than what is capable from the IC engine. Under these conditions the IVT output torque and speed may result in excessive wheel slippage and other undesirable characteristics. Likewise, if an external load from another external function to the transmission is activated, such as hydraulic functions, the external load combined with the transmission output capability may place the engine in an overload condition.

The demands for increased performance and fuel economy will increase significantly for work machines within the next decade. This will be complicated by the implementation of devices to reduce emissions. The increasing size and productivity of work machines is expected to result in power demand higher than will be available from economical single internal combustion engines. This will drive the development of vehicles using very large, heavy and expensive industrial engines. The complexity and cost of such engines may be prohibitive and curtail the implementation of higher capacity machinery.

One method around the problem is to use hybrid electric-IC engine technology with a storage battery to supplement the internal combustion engine with electric power boost. This is expected to work very well, but the electric power boost is only available for relatively short periods of time. The amount of time available for electric boost is determined by the size of the battery. Batteries with enough capacity to provide sustained levels of power boost will of necessity be large, heavy and costly, thus limiting their practicality.

Another advantage with battery boosted hybrids is the ability to operate electrical drives with the IC engine shut down. For example, the HVAC, lights, air compressors, cooling fans, grain tank unloading systems, etc., could be operated without the need to start the IC engine. The length of time these drives can be operated with the engine off is limited, again, by the size of the battery. Batteries large enough to do significant work for extended time periods with the engine off may be too large, heavy and costly to be practical.

What is needed in the art is a work machine and corresponding method of operation providing sustained, increased power capability with many of the advantages of electric-IC engine hybrids, while still meeting increasingly stringent emissions requirements.

SUMMARY OF THE INVENTION

The invention in one form is directed to an agricultural harvester, including a first power unit having a first rated output. The first power unit is couplable with a first primary load, including a threshing system load. A second power unit has a second rated output. The second power unit is couplable with a second primary load, including a propulsion load. A first motor/generator is mechanically coupled with the first power unit, and a second motor/generator is mechanically coupled with the second power unit. The second motor/generator is configured to electrically drive at least one external load. The second motor/generator and the first motor/generator are electrically coupled together.

The invention in another form is directed to a method of operating an agricultural harvester, including the steps of: driving a threshing system load with a first power unit, the first power unit having a first rated output; driving a propulsion load with a second power unit, the second power unit having a second rated output, and being mechanically independent from the first power unit; driving a first motor/generator with the first power unit; driving a second motor/generator with the second power unit; driving an external load with the first motor/generator or the second motor/generator; monitoring a total load on the first power unit and/or second power unit; and bidirectionally transferring electrical power between the first motor/generator and the second motor/generator, dependent upon the monitoring.

DETAILED DESCRIPTION OF THE INVENTION

Figure 1:
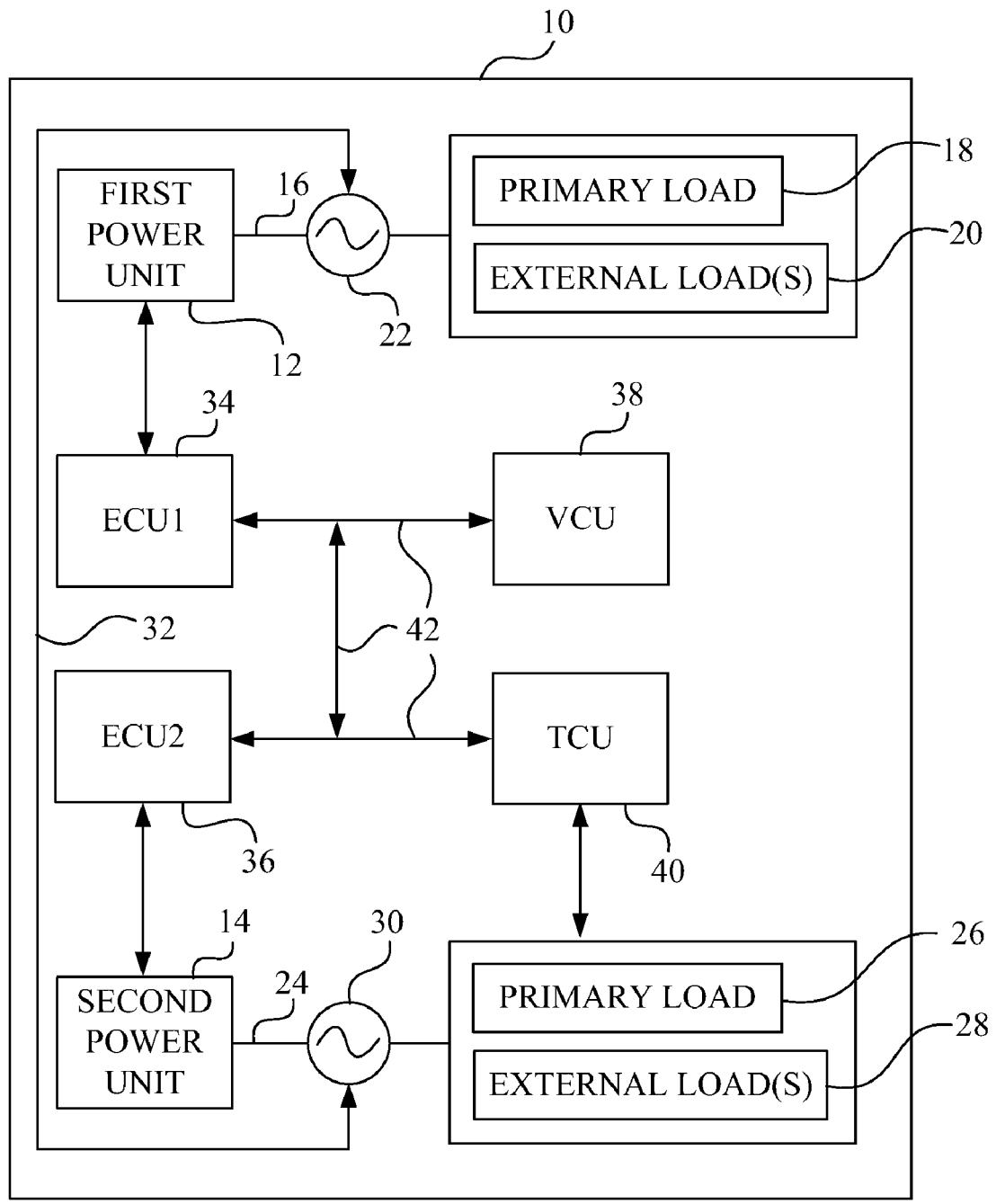
FIG. 1 is a schematic illustration of an embodiment of a work machine of the present invention.

Referring now to FIG. 1, there is shown a schematic illustration of an embodiment of a work machine 10 of the present invention. Work machine 10 is assumed to be an agricultural work machine in the form of a John Deere agricultural combine, but could be a different type of work machine such as a construction, forestry, mining, or industrial work machine.

Work machine 10 includes a first power unit in the form on a first IC engine 12, and a second power unit in the form of a second IC engine 14. First IC engine 12 has a first drivetrain, typically including an output crankshaft 16, with a first rated output which drives a first primary load 18, and optionally one or more external loads 20. First primary load 18 is a threshing system load associated with one or more of the following: a cutting platform; a header; a feederhousing; a rotor; a separator; and a residue chopper. First primary load 18 preferably is a drivetrain load which is mechanically driven by first IC engine 12, but can also be electrically driven by a first motor/generator 22.

Second IC engine 14 is mechanically independent from first IC engine 12. Second IC engine 14 has a second drivetrain, typically including an output crankshaft 24, which drives a second primary load 26, and one or more external loads 28. Second IC engine 14 has a second rated output which is approximately the same as the first rated output of first IC engine 12. In the embodiment shown, first IC engine 12 and second IC engine 14 are each assumed to have a rated output of 250 kW.

Second primary load 26 is a propulsion load for selectively propelling work machine 10 across the ground. To that end, an IVT in the form of a hydrostatic transmission may be selectively engaged/disengaged with crankshaft 24, and provides motive force to one or more drive wheels. Of course, it will be appreciated that in the case of a track-type work vehicle, crankshaft 24 may be coupled with a ground engaging track. Second primary load 26 preferably is a drivetrain load which is mechanically driven by second IC engine 14, but can also be electrically driven by a second motor/generator 30.

The one or more external loads 28 may include one or more auxiliary loads, and may also include one or more parasitic loads. Auxiliary loads are non-drivetrain hydraulic or electric loads placed upon second IC engine 14 through selective operator intervention (e.g., an auxiliary hydraulic load such as an unloading auger on a combine, a front end loader, a backhoe attachment, etc.) Parasitic loads are non-drivetrain loads placed upon second IC engine 14 through normal operation of the work machine, without operator intervention (e.g., an electrically driven engine cooling fan associated with first IC engine 12, etc.). The external loads can be powered from individual electric motors powered by second motor/generator 30, or can optionally be powered directly from second motor/generator 30.

In the embodiment shown in FIG. 1, external loads 20 are optional loads that can be placed upon first IC engine 12, and all of the external loads 28 are carried by second IC engine 14. This is because it is anticipated that slug loads carried by first IC engine 12 from the threshing system may be high, and the external loads are thus shifted to second IC engine 14. However, it is possible to split the external loads between first IC engine 12 and second IC engine 14, dependent upon expected loads, size of the IC engines (which could be the same or different), number of external loads, etc.

First IC engine 12 and second IC engine 14 are each assumed to be a diesel engine in the illustrated embodiment, but could also be a gasoline engine, propane engine, etc. IC engines 12 and 14 are sized and configured according to the application.

First motor/generator 22 and second motor/generator 30 are electrically coupled together via power line 32 to pass electrical power back and forth between first motor/generator 22 and second motor/generator 30. When receiving electrical power, the particular motor/generator 22 or 30 is operated as a motor to add mechanical power to the output from a respective IC engine 12 or 14, as will be described in more detail below.

An electrical processing circuit for controlling operation of work machine 10 generally includes a first engine control unit (ECU) 34, a second ECU 36, a vehicle control unit (VCU) 38, and a transmission control unit (TCU) 40. First ECU 34 electronically controls operation of first IC engine 12, and is coupled with a plurality of sensors (not specifically shown) associated with operation of first IC engine 12. For example, ECU 34 may be coupled with a sensor indicating engine control parameters such as an air flow rate within one or more intake manifolds, engine speed, fueling rate and/or timing, exhaust gas recirculation (EGR) rate, turbocharger blade position, etc. Additionally, ECU 32 may receive output signals from VCU 38 representing vehicle control parameters input by an operator, such as a commanded ground speed (indicated by a position of the gear shift lever and throttle and/or hydrostat lever) or a commanded direction of work machine 10 (indicated by an angular orientation of the steering wheel).

Similarly, second ECU 36 electronically controls operation of second IC engine 14. ECU 36 operates in a manner similar to ECU 32 described above, and will not be described in further detail. It will also be appreciated that for certain applications, ECU 34 and ECU 36 can be combined into a single controller.

TCU 38 electronically controls operation of the IVT making up second primary load 26, and is typically coupled with a plurality of sensors (not shown) associated with operation of the IVT. ECU 34, ECU 36, VCU 38 and TCU 40 are coupled together via a bus structure providing two-way data flow, such as controller area network (CAN) bus 42.

Although the various electronic components such as ECU 34, ECU 36, VCU 38 and TCU 40 are shown coupled together using wired connections, it should also be understood that wireless connections may be used for certain applications.

Figure 2:
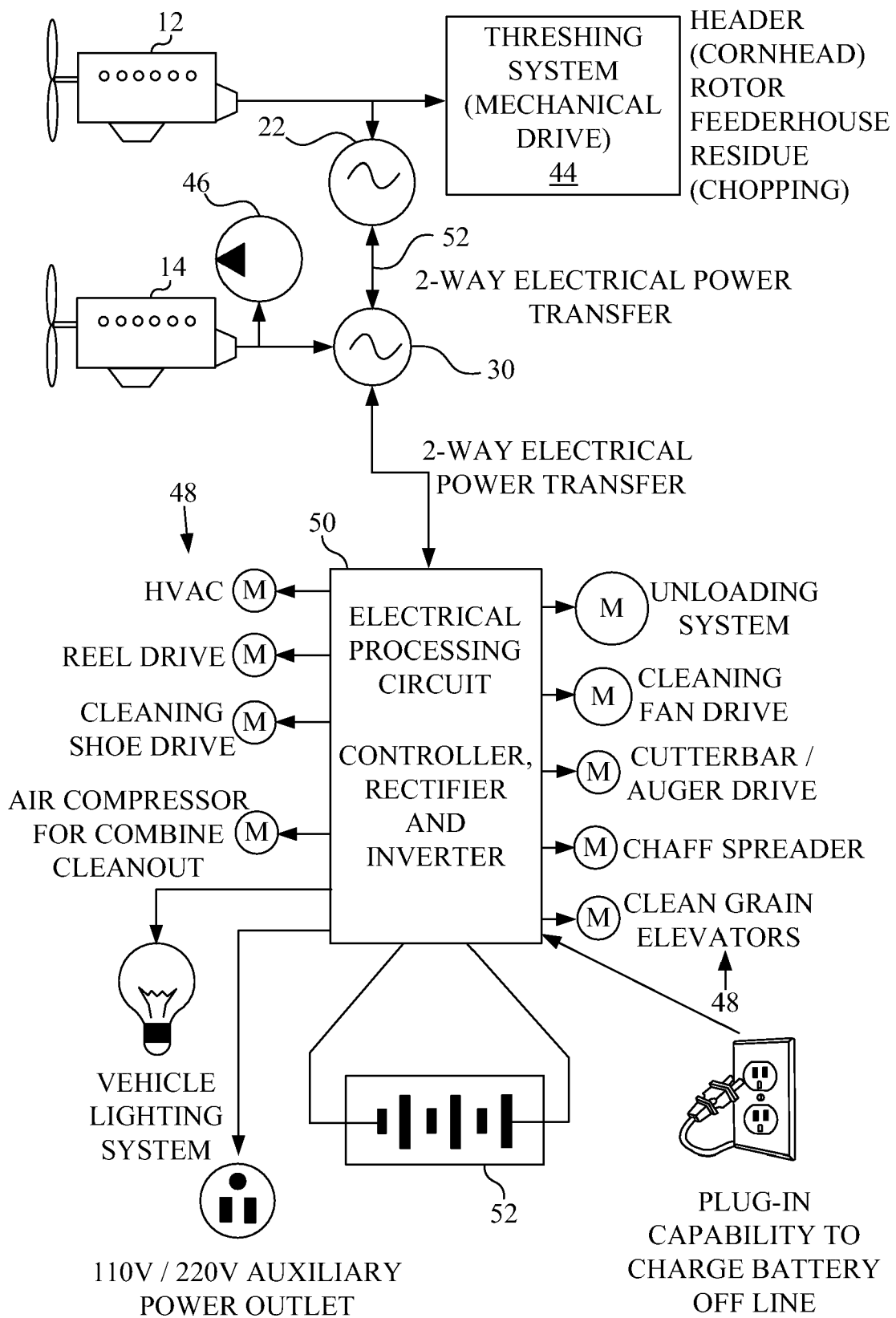
FIG. 2 is a schematic illustration of a particular embodiment of a work machine of the present invention in the form of an agricultural combine.

Referring now to FIG. 2, a specific embodiment of work machine 10 of the present invention in the form of an agricultural combine will be described in greater detail. The primary loads driven by first IC engine 12 and second IC engine 14 include two types of drivetrain driven loads. Namely, first IC engine 12 drives a primary load associated with a threshing system 44, and second IC engine 14 drives a primary load associated with a hydrostatic propulsion 46. The threshing system loads are drivetrain loads associated with one or more of the following: a cutting platform; a header; a feederhousing; a rotor; a separator; and a residue chopper.

The external loads driven by second IC engine 14 include two types of non-drivetrain, hydraulic or electrical loads; namely, auxiliary loads commanded by an operator and parasitic loads not commanded by an operator. In the embodiment of FIG. 2, the auxiliary loads 48 are non-drivetrain loads associated with one or more of the following: a heating and air conditioning system; a reel drive; a cleaning shoe drive; an air compressor for cleanout function; a vehicle lighting system; a clean grain unloading system; a cleaning fan drive; a cutterbar/auger drive; a chaff spreader; a clean grain elevator; and an auxiliary electrical power outlet. All of these auxiliary loads 48 (except the lighting system and auxiliary electrical power outlet) are indicated as being electrically driven loads, powered by respective electric motors (each designated "M", but not specifically numbered). The various motors M are selectively energized using an electrical processing circuit 50 (shown schematically in block form), which may include VCU 38, a rectifier and a DC-to-AC inverter. Electrical processing circuit 44 electrically couples second motor/generator 46 with a motor M associated with a selected auxiliary load 48. When providing electrical power to one or more auxiliary loads 48, it will be appreciated that second motor/generator 30 is operated as a motor/generator with an electric power output. The auxiliary loads can also include one or more operator initiated hydraulic loads, not shown.

In the event that second IC engine 14 is not operating and electrical power is required for temporary powering of one or more auxiliary loads 48, an electrical storage battery 52 is also coupled with electrical processing circuit 50. Of course, a bank of batteries can be electrically connected together for a higher amp*hour rating. The power from battery 52 can be applied as DC power, or inverted and applied as AC power.

The auxiliary loads 48 can be hardwired to the electrical processing circuit 50, second motor/generator 30 and/or battery 52, or alternatively may be coupled using modular connectors or plugs (e.g., one or more of the electrical plug-in outlets shown in FIG. 2A). Further, the auxiliary loads 28 may be driven at the same or a different operating speed than the first IC engine 12. This allows the external load functions to be at a different speed than the threshing and propulsion functions, which can be important for certain operating conditions such as tougher crop material when approaching dusk, etc.

According to another aspect of the present invention, first motor/generator 22 and second motor/generator 30 are electrically coupled together, as indicated by electric power line 32. This allows intelligent power management (IPM) by splitting the power needs between first IC engine 12 and second IC engine 14. Electric power can be transferred from first motor/generator 22 to second motor/generator 30, or vice versa, depending upon the power needs associated with primary loads 18 and 26, or auxiliary loads 48.

Figure 3:
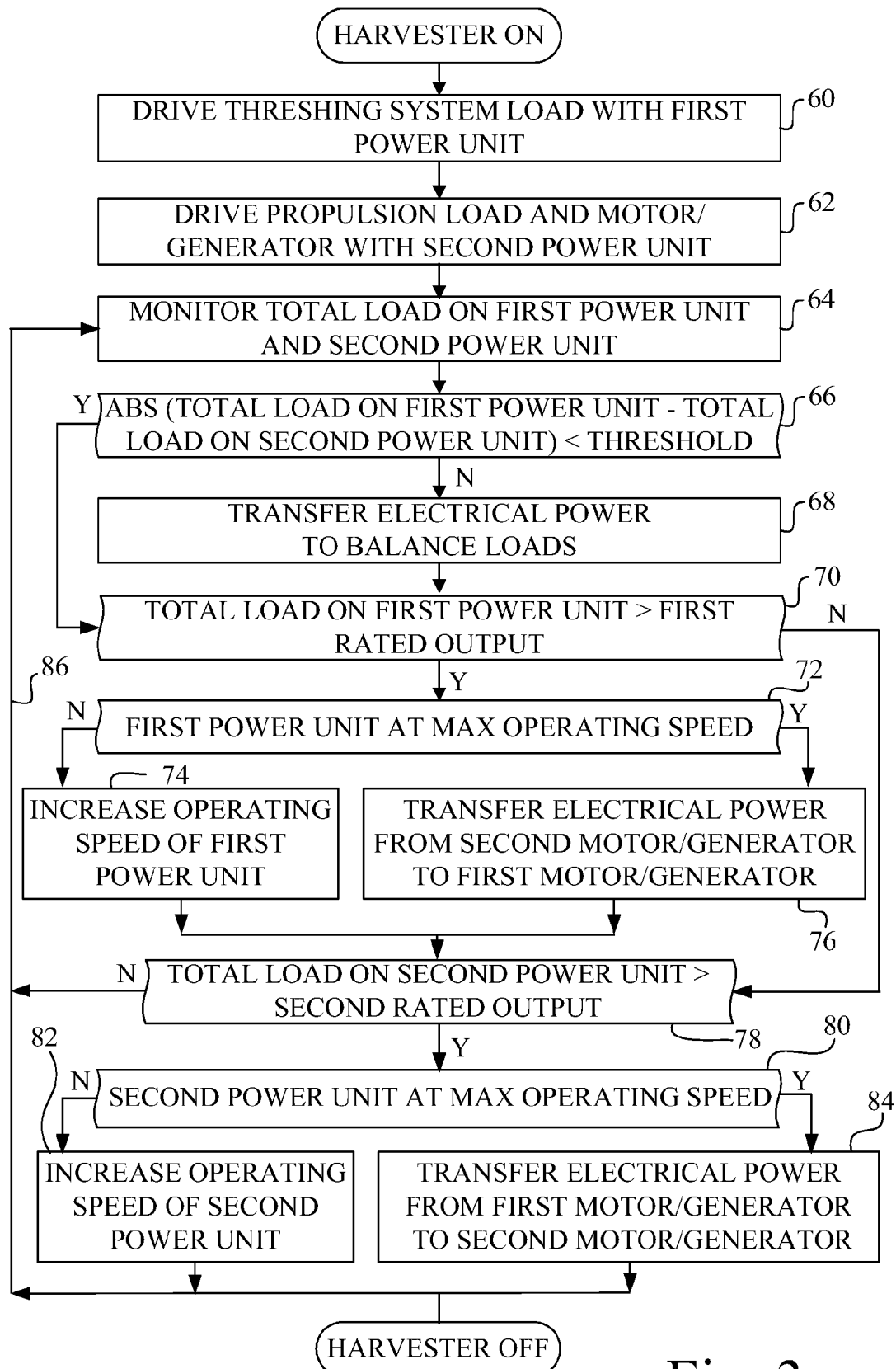
FIG. 3 is an embodiment of a method of operation of the work machine shown in FIG. 2.

Referring now to FIG. 3, a method of operating work machine 10 using IPM with first motor/generator 22 and second motor/generator 30 will be described in greater detail. When the harvester 10 is at a field for harvesting operations, first IC engine 12 is used to drive the threshing system and second IC engine 14 is used to drive the propulsion system (blocks 60 and 62). Concurrently, first IC engine 12 is used to drive first motor/generator 22 and second IC engine 14 is used to drive second motor/generator 30. The auxiliary loads 48 which are driven by second motor/generator 30 in turn add to the load placed on second IC engine 14. The total loads placed on each of first IC engine 12 and second IC engine 14 are monitored to assure that the engines are not at or near an overload condition (block 64). In the event that the engines are not in an overload condition, but the loads on each respective engine are not equal to each other within a predefined amount, then electrical power is transferred between first motor/generator 22 and second motor/generator 30 to balance the loads (decision block 66 and block 68). In other words, the motor/generator on the engine with a lesser load is operated with a generator output, and the motor/generator on the engine with a greater load is operated with a motor output.

On the other hand, if the loads are balanced to within a predefined limit, then a query is made to ensure that the first IC engine 12 is not at or above it's rated output (decision block 70). It will be appreciated to those familiar in the IC engines arts that the rated output for a given engine changes as the RMP of the engine changes. At a given operating speed, the rated output is in essence the upper limit on the torque curve for that engine at the given operating speed. As the engine speed increases, the rated output typically likewise increases, up to the maximum rated operating speed for the engine. If the monitored load on the first IC engine 12 is at or above the rated output, but the engine is not operating at the maximum operating speed, then it is possible to simply increase the engine operating speed to thereby increase the rated output (decision block 70, decision block 72 and block 74). However, under certain operating conditions, the latent response time from the IC engine 12 may not be fast enough to prevent excess pull down of the engine. Under these circumstances, it may be quicker to add power to the output drivetrain from first IC engine 12 by transferring electrical power from second motor/generator 30 to first motor/generator 22.

If the monitored load on the first IC engine 12 is at or above the rated output, but the engine is operating at the maximum operating speed, then power is added to the output drivetrain from first IC engine 12 by transferring electrical power from second motor/generator 30 to first motor/generator 22. (decision block 70, decision block 72 and block 76). In other words, it is not possible to further increase the rated output of first IC engine 12 by increasing the RPM of first IC engine 12, so additional power must be added by transferring electrical power to first motor/generator 22 and operating first motor/generator 22 in a motor mode.

Next, the total load on the second IC engine 14 is compared with the rated output at a given operating speed. The same process of adding to the output of second IC engine 14 can be carried out using the same methodology as described above with regard to first IC engine 12 (blocks 70-76). That is, the output of second IC engine 14 can be increased by increasing the engine speed of second IC engine 14 (decision block 78, decision block 80 and block 82), or transferring electrical power to second motor/generator 30 operating in a motor mode (decision block 78, decision block 80 and block 84). The control logic then repeats (line 86) until the harvester is turned off.

Having described the preferred embodiment, it will become apparent that various modifications can be made without departing from the scope of the invention as defined in the accompanying claims.

The invention claimed is:

1. An agricultural harvester, comprising:
    a first power unit having a first rated output, said first power unit being couplable with a first primary load, said first primary load including a threshing system load;
    a second power unit having a second rated output, said second power unit being couplable with a second primary load, said second primary load including a propulsion load;
    a first motor/generator mechanically coupled with said first power unit; and
    a second motor/generator mechanically coupled with said second power unit, said second motor/generator being configured to electrically drive at least one external load, said second motor/generator and said first motor/generator being bidirectionally electrically coupled together.

2. The agricultural harvester of claim 1, including at least one electrical processing circuit configured for selective bidirectional transfer of electrical power between said first motor/generator and said second motor/generator.

3. The agricultural harvester of claim 1, wherein said first motor/generator is configured to electrically drive at least one external load.

4. The agricultural harvester of claim 1, wherein said first motor/generator is mechanically interconnected between said first power unit and said first primary load, and said second motor/generator is mechanically interconnected between said second power unit and said second primary load.

5. The agricultural harvester of claim 1, wherein each of said first motor/generator and said second motor/generator include a mechanical input, a mechanical output, and an electrical input/output.

6. The agricultural harvester of claim 1, wherein said first rated output is approximately equal to said second rated output.

7. The agricultural harvester of claim 1, wherein said at least one external load includes an operator initiated load.

8. The agricultural harvester of claim 1, wherein said agricultural harvester is an agricultural combine, and said threshing system load corresponds to at least one of:
    a cutting platform;
    a header;
    a feederhousing;
    a rotor;
    a separator; and
    a residue chopper.

9. The agricultural harvester of claim 1, wherein each said external load corresponds to one of a parasitic load and an auxiliary load.

10. The agricultural harvester of claim 9, wherein each said parasitic load is a non-drivetrain load without operator intervention, and each said auxiliary load is a non-drivetrain load with operator intervention.

11. The agricultural harvester of claim 9, wherein said work machine is an agricultural combine, and said at least one auxiliary load corresponds to at least one of:
    a heating and air conditioning system;
    a reel drive;
    a cleaning shoe drive;
    an air compressor for cleanout function;
    a vehicle lighting system;
    a clean grain unloading system;
    a cleaning fan drive;
    a cutterbar/auger drive;
    a chaff spreader;
    a clean grain elevator; and
    an auxiliary electrical power outlet.

12. The agricultural harvester of claim 1, wherein said first power unit and said second power unit are each an internal combustion (IC) engine.

13. The agricultural harvester of claim 1, including at least one battery which is electrically connectable with at least one said external load.

14. The agricultural harvester of claim 1, wherein said work machine comprises one of a construction work machine, an agricultural work machine, a forestry work machine, a mining work machine, and an industrial work machine.

15. The agricultural harvester of claim 1, wherein said first power unit includes a first drive train and said second power unit includes a second drive train, said first primary load being driven by said first drive train and said second primary load being driven by said second drive train.

16. A work machine, comprising:
    a first power unit having a first rated output, said first power unit being couplable with a first primary load;
    a second power unit having a second rated output, said second power unit being mechanically independent from said first power unit;
    a first motor/generator mechanically coupled with said first power unit; and
    a second motor/generator mechanically coupled with said second power unit, said second motor/generator being configured to electrically drive at least one external load, said second motor/generator and said first motor/generator being bidirectionally electrically coupled together.

17. The work machine of claim 16, including at least one electrical processing circuit configured for selective bidirectional transfer of electrical power between said first motor/generator and said second motor/generator.

18. The work machine of claim 16, wherein said second power unit is couplable with a second primary load.

19. The work machine of claim 16, wherein said first motor/generator is configured to electrically drive at least one external load.

20. The work machine of claim 16, wherein said first motor/generator is mechanically interconnected between said first power unit and said first primary load, and said second motor/generator is mechanically interconnected between said second power unit and said second primary load.

21. The work machine of claim 16, wherein said work machine is an agricultural combine, said first primary load includes a threshing system load, and said second primary load includes a propulsion load.

22. A method of operating an agricultural harvester, comprising the steps of:
    driving a threshing system load with a first power unit, said first power unit having a first rated output;
    driving a propulsion load with a second power unit, said second power unit having a second rated output, said second power unit being mechanically independent from said first power unit;
    driving a first motor/generator with said first power unit;
    driving a second motor/generator with said second power unit;
    driving an external load with one of said first motor/generator and said second motor/generator;

monitoring a total load on at least one of said first power unit and said second power unit; and bidirectionally transferring electrical power between said first motor/generator and said second motor/generator, dependent upon said monitoring.

23. The method of operating an agricultural harvester of claim 22, wherein said monitoring step includes:

monitoring a total load on said first power unit;

comparing said total load on said first power unit with said first rated output; and transferring electrical power from said second motor/generator to said first motor/generator if said total load on said first power unit is greater than said first rated output.

24. The method of operating an agricultural harvester of claim 22, wherein said monitoring step includes:

monitoring a total load on said first power unit;

comparing said total load on said first power unit with said first rated output;

determining if said first power unit is at a maximum rated operating speed;

increasing an operating speed of said first power unit if said first power unit is operating below said maximum rated operating speed; and transferring electrical power from said second motor/generator to said first motor/generator if said first power unit is operating at or near said maximum rated operating speed, and said total load on said first power unit is greater than said first rated output.

25. The method of operating an agricultural harvester of claim 22, wherein said monitoring step includes:

monitoring a total load on said second power unit;

comparing said total load on said second power unit with said second rated output; and transferring electrical power from said first motor/generator to said second motor/generator if said total load on said second power unit is greater than said second rated output.

26. The method of operating an agricultural harvester of claim 22, wherein said monitoring step includes:

monitoring a total load on said second power unit;

comparing said total load on said second power unit with said second rated output;

determining if said second power unit is at a maximum rated operating speed;

increasing an operating speed of said second power unit if said second power unit is operating below said maximum rated operating speed; and transferring electrical power from said first motor/generator to said second motor/generator if said second power unit is operating at or near said maximum rated operating speed, and said total load on said second power unit is greater than said second rated output.

27. The method of operating an agricultural harvester of claim 22, wherein said monitoring step includes monitoring a total load on each of said first power unit and said second power unit, and including the steps of:

comparing a total load on said first power unit with a total load on said second power unit; and transferring electrical power between said first motor/generator and said second motor/generator to thereby balance a total load on each of said first power unit and said second power unit.

* * * * *

UNITED STATES PATENT AND TRADEMARK OFFICE
Certificate

Patent No. 7,788,889 B2                                                          Patented: September 7, 2010

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Alan Sheidler, Moline, IL (US); Ronnie D. Stahlhut, Bettendorf, IA (US); Jim M. Shoemaker, Bettendorf, IA (US); Ryan P. Mackin, Milan, IL (US); and Daniel J. Burke, Cordova, IL (US).

Signed and Sealed this Twenty-sixth Day of June 2012.

THOMAS B. WILL
*Supervisory Patent Examiner*
Art Unit 3671
Technology Center 3600